United States Patent
Hashimoto

(10) Patent No.: US 10,711,894 B2
(45) Date of Patent: Jul. 14, 2020

(54) VEHICLE AND ELECTRIC POWER TRANSMISSION SYSTEM

(71) Applicant: Toyota Jidosha Kabushiki Kaisha, Toyota-shi, Aichi-ken (JP)

(72) Inventor: Toshiya Hashimoto, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 235 days.

(21) Appl. No.: 15/899,504

(22) Filed: Feb. 20, 2018

(65) Prior Publication Data

US 2018/0238449 A1    Aug. 23, 2018

(30) Foreign Application Priority Data

Feb. 23, 2017    (JP) ................. 2017-032169

(51) Int. Cl.
| | |
|---|---|
| *H01F 38/00* | (2006.01) |
| *F16H 63/48* | (2006.01) |
| *F16H 63/34* | (2006.01) |
| *B60L 53/12* | (2019.01) |
| *F16H 61/32* | (2006.01) |

(52) U.S. Cl.
CPC ............ *F16H 63/483* (2013.01); *B60L 53/12* (2019.02); *F16H 63/3466* (2013.01); *B60L 2270/20* (2013.01); *B60Y 2300/90* (2013.01); *B60Y 2300/91* (2013.01); *B60Y 2300/92* (2013.01); *F16H 2061/326* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ..................................... F16H 63/48

USPC .................................................. 307/9.1, 104
See application file for complete search history.

(56) References Cited

U.S. PATENT DOCUMENTS

| | | |
|---|---|---|
| 2013/0127409 A1 | 5/2013 | Ichikawa |
| 2013/0193749 A1 | 8/2013 | Nakamura et al. |
| 2013/0307471 A1* | 11/2013 | Ichikawa ................ H02J 7/007 320/108 |

(Continued)

FOREIGN PATENT DOCUMENTS

| | | |
|---|---|---|
| JP | 2013-110822 A | 6/2013 |
| JP | 2013-126327 A | 6/2013 |

(Continued)

*Primary Examiner* — Rexford N Barnie
*Assistant Examiner* — Dru Parries
(74) *Attorney, Agent, or Firm* — Dinsmore & Shohl LLP

(57) ABSTRACT

A vehicle includes: a power receiving part; an operating part configured to allow a driver to select a parking lock state or a non-parking lock state; a parking lock device configured to be mechanically switchable between the parking lock state and the non-parking lock state; and a controller configured to control the parking lock device according to an electric signal output from the operating part. While the power receiving part is receiving electric power with the parking lock device being in the parking lock state, the controller: sends a first command that commands stop of power feeding to the power receiving device to the power feeding device when the non-parking lock state is selected; and controls the parking lock device so that the parking lock device is switched from the parking lock state to the non-parking lock state after electric power has decreased to a predetermined value or lower.

4 Claims, 4 Drawing Sheets

(56) References Cited

U.S. PATENT DOCUMENTS

2015/0008877 A1   1/2015   Ichikawa et al.
2016/0159226 A1   6/2016   Tsukamoto

FOREIGN PATENT DOCUMENTS

| JP | 2013-146148 A | 7/2013 |
| JP | 2013-146154 A | 7/2013 |
| JP | 2013154815 A | 8/2013 |
| JP | 2015-100228 A | 5/2015 |
| WO | 2014208273 A1 | 12/2014 |

* cited by examiner

VEHICLE AND ELECTRIC POWER TRANSMISSION SYSTEM

CROSS-REFERENCE TO RELATED APPLICATIONS

This application claims priority to Japanese Patent Application No. 2017-032169 filed on Feb. 23, 2017, which is incorporated herein by reference in its entirety including the specification, drawings and abstract.

BACKGROUND

1. Technical Field

This disclosure relates to a vehicle and an electric power transmission system. More particularly, this disclosure relates to a vehicle that is equipped with a power receiving device that receives electric power contactlessly from a power feeding device that is located outside the vehicle, and an electric power transmission system that transmits electric power contactlessly from a power feeding device to a power receiving device that is mounted in a vehicle.

2. Description of Related Art

An electric power transmission system that transmits electric power contactlessly from a power feeding device that is located outside a vehicle to a power receiving device that is mounted in the vehicle is known (refer to Japanese Patent Application Publication No. 2015-100228 (JP 2015-100228 A), Japanese Patent Application Publication No. 2013-154815 (JP 2013-154815 A), Japanese Patent Application Publication No. 2013-146154 (JP 2013-146154 A), Japanese Patent Application Publication No. 2013-146148 (JP 2013-146148 A), Japanese Patent Application Publication No. 2013-110822 (JP 2013-110822 A) and Japanese Patent Application Publication No. 2013-126327 (JP 2013-126327 A), for example). In such an electric power transmission system, transmission of electric power from the power feeding device to the power receiving device is in general executed on condition that a parking lock device that is mechanically switchable between a parking lock state where rotation of an axle is locked and a non-parking lock state where the parking lock state is cancelled is in the parking lock state.

For example, JP 2015-100228 A discloses that in such an electric power transmission system, a power feeding stop command is sent from the vehicle to the power feeding device to stop transmission of electric power from the power feeding device to the power receiving device when a shift range that is detected by a shift range detection part of the vehicle is not a parking range (P range), in other words, when the parking lock device is in the non-parking lock state (refer to JP 2015-100228 A).

SUMMARY

The technology that is described in JP 2015-100228 A is one by which transmission of electric power from the power feeding device to the power receiving device is stopped when the parking lock device is switched from the parking lock state to the non-parking lock state during transmission of electric power from the power feeding device to the power receiving device. However, because the vehicle becomes movable when the parking lock device is switched to the non-parking lock state, the vehicle may be moved before the electric power that is being transmitted decreases sufficiently in response to the switching to the non-parking lock state. When the vehicle is moved during transmission of electric power from the power feeding device to the power receiving device, a coupling coefficient between the power feeding part and the power receiving part experiences a sudden change (sudden decreases), which may result in problems such as occurrence of a current that exceeds an upper limit in the power feeding device. To avoid such problems, the sizes of electric components may be increased in order to protect various electric components even in such a situation.

It is, therefore, an object of this disclosure is to prevent, in a vehicle that is equipped with a power receiving device that receives electric power contactlessly from a power feeding device that is located outside the vehicle, problems, such as occurrence of a current that exceeds an upper limit, that may occur when a parking lock device is switched from a parking lock state to a non-parking lock state during transmission of electric power from the power feeding device to the power receiving device.

Another object of this disclosure is to prevent, in an electric power transmission system in which electric power is transmitted contactlessly from a power feeding device to a power receiving device that is mounted in a vehicle, problems, such as occurrence of a current that exceeds an upper limit, that may occur when a parking lock device is switched from a parking lock state to a non-parking lock state during transmission of electric power from the power feeding device to the power receiving device.

A vehicle of this disclosure is a vehicle equipped with a power receiving device that receives electric power contactlessly from a power feeding device that is located outside the vehicle, and includes a power receiving part, a communication part, an operating part, a parking lock device, and a controller. The power receiving part is configured to receive electric power contactlessly from a power feeding part of the power feeding device. The communication part is configured to communicate with the power feeding device. The operating part is configured to allow a driver to select a parking lock state where rotation of an axle is locked or a non-parking lock state where the parking lock state is cancelled. The parking lock device is configured to be switchable between the parking lock state and the non-parking lock state mechanically. The controller is configured to control the parking lock device according to an electric signal that is output from the operating part. While the power receiving part is receiving electric power with the parking lock device in the parking lock state, the controller: sends a first command that commands stop of power feeding to the power receiving device to the power feeding device via the communication part when the non-parking lock state is selected by the operating part; and controls the parking lock device so that the parking lock device is switched from the parking lock state to the non-parking lock state after electric power that is being transmitted from the power feeding device to the power receiving device has decreased to a predetermined value or lower.

An electric power transmission system according to this disclosure is an electric power transmission system includes a vehicle equipped with a power receiving device and a power feeding device located outside the vehicle. The power feeding device includes a power feeding part that is configured to feed electric power contactlessly to the power receiving device. The vehicle includes a power receiving part, a first communication part, an operating part, a parking lock device, and a controller. The power receiving part is configured to receive electric power contactlessly from the power feeding part. The first communication part is configured to communicate with the power feeding device. The operating part is configured to allow a driver to select a parking lock state or a non-parking lock state. The parking lock device is configured to be switchable between the parking lock state and the non-parking lock state mechanically. The controller is configured to control the parking lock device according to an electric signal that is output from the operating part. While the power receiving part is receiving electric power with the parking lock device in the parking lock state, the controller: sends a first command that commands stop of power feeding to the power receiving device to the power feeding device via the first communication part when the non-parking lock state is selected by means of the operating part; and controls the parking lock device so that the parking lock device is switched from the parking lock state to the non-parking lock state after electric power that is being transmitted from the power feeding device to the power receiving device has decreased to a predetermined value or lower.

In the above vehicle and electric power transmission system, the parking lock device is controlled according to an electric signal that is output from the operating part, which allows the driver to select the parking lock state or the non-parking lock state. Such as configuration can be achieved in conjunction with so-called a shift-by-wire system in which shift ranges (D range, R range and so on) are electrically controlled according to a detected position of a shift lever, for example. In the vehicle and electric power transmission system, when the non-parking lock state is selected by the operating part while the power receiving part is receiving electric power with the parking lock device in the parking lock state, a first command that commands stop of power feeding is sent to the power feeding device, and the parking lock device is switched to the non-parking lock state after electric power that is being transmitted has decreased sufficiently. According to the vehicle and electric power transmission system, because the parking lock device is switched to the non-parking lock state after electric power that is being transmitted has decreased sufficiently, problems, such as occurrence of a current that exceeds an upper limit, do not occur even when a coupling coefficient between the power feeding part and power receiving part experiences a sudden change by moving the vehicle.

The above vehicle may further include an electric storage device. The electric storage device stores electric power that is received by the power receiving part. The controller may send a second command that commands stop of power feeding to the power receiving device to the power feeding device via the communication part when charge of the electric storage device with the electric power that is received by the power receiving part is completed. Here, a power reduction rate at which outgoing power is reduced according to the first command may be higher than that at which outgoing power is reduced according to the second command.

In the above electric power transmission system, the vehicle may further include an electric storage device, and the power feeding device may further include a power source part, a power source controller, and a second communication part. The electric storage device stores electric power that is received by the power receiving part. The power source part is configured to generate outgoing power that is supplied to the power feeding part. The power source controller controls the power source part. The second communication part is configured to communicate with the first communication part of the vehicle. The controller may send a second command that commands stop of power feeding to the power receiving device to the power feeding device via the first communication part when charge of the electric storage device with the electric power that is received by the power receiving part is completed. The power source controller may control the power source part so that the outgoing power can decrease at a first power reduction rate when the power source controller receives the second command via the second communication part, and control the power source part so that the outgoing power can decrease at a second power reduction rate that is higher than the first power reduction rate when the power source controller receives the first command via the second communication part.

In the above vehicle and electric power transmission system, the rate at which electric power is reduced when power feeding is stopped because the non-parking lock state is selected by means of the operating part (second power reduction rate) is higher than the rate at which electric power is reduced when power feeding is stopped because charge of the electric storage device is completed (first power reduction rate). Thus, electric power decreases quickly when the non-parking lock state is selected by means of the operating part and, consequently, the parking lock device is switched to the non-parking lock state immediately. Thus, according to the vehicle and electric power transmission system, it is possible to fulfill the user's desire to cancel the transmission of electric power and move the vehicle quickly.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
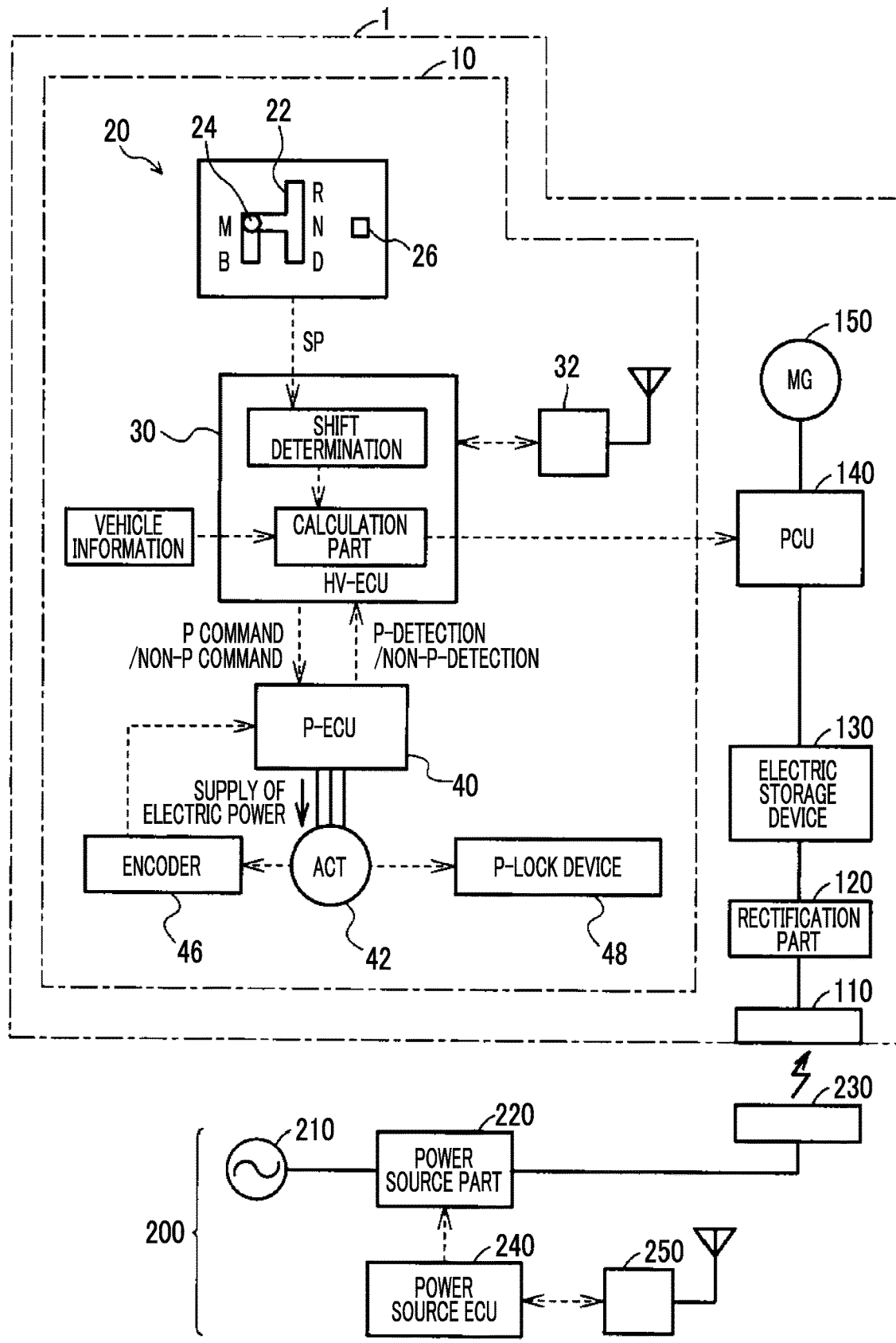
FIG. 1 is a diagram that illustrates a general configuration of an electric power transmission system according to an embodiment of this disclosure.

An embodiment of this disclosure is hereinafter described in detail with reference to the drawings. The same or corresponding parts are designated by the same reference numerals in all the drawings and their description is not repeated.

FIG. 1 is a diagram that illustrates a general configuration of an electric power transmission system according to an embodiment of this disclosure. Referring to FIG. 1, the electric power transmission system includes a vehicle 1, and a power feeding device 200. The vehicle 1 includes a shift control system 10. The shift control system 10 functions as a shift-by-wire system that switches shift ranges (parking range (P range), drive ranges (D range, R range), neutral range (N range), brake range (B range) and so on) by electrical control. The shift control system 10 includes a shift operation device 20, an HV-ECU (Electronic Control Unit) 30, a communication device 32, a parking ECU (P-ECU) 40, an actuator 42, an encoder 46, and a parking lock device (P-lock device) 48. The shift control system 10 is activated when a start switch (not shown) or the like is turned on by a user, and deactivated when the start switch or the like is turned off.

The shift operation device 20 includes a shift gate 22, a shift lever 24, and a parking switch (P-switch) 26. The shift lever 24, which is a momentary-type lever, for example, is maintained in an "M" position unless it is operated by the user and is moved along the shift gate 22 when it is operated by the user. The structure and operation of a momentary-type shift lever fall within a well-known technology and its detailed description is not provided.

In the shift gate 22, a "D" position for selecting a forward drive range (D range), an "R" position for selecting a reverse drive range (R range), an "N" position for selecting a neutral range (N range), a "B" position for selecting a brake range (B range) and so on are provided in addition to the above "M" position. When the shift lever 24 is operated, a signal SP that indicates the position that has been selected by means of the shift lever 24 is sent to the HV-ECU 30.

The P-switch 26 is a switch for selecting the P range, in which rotation of an axle is mechanically locked. The user can achieve switching from a range other than the P range (such as the above D range, R range or the like, which is hereinafter also referred to comprehensively as "non-P range") to the P range by operating the P-switch 26. When the P-switch 26 is operated, a signal SP that indicates that the P range has been selected is sent to the HV-ECU 30.

When the shift lever 24 is operated when the P range has been selected, a signal SP that indicates the position that has been selected by means of the shift lever 24 is sent to the HV-ECU 30. In other words, when the P range has been selected, the user can select a range (non-P range) of the position that is selected by means of the shift lever 24 by operating the shift lever 24.

A "P" position for selecting the P range may be provided in the shift gate 22 so that the P range can be selected by operating the shift lever 24. Alternatively, a shift switch for selecting the "D" position, "R" position, "N" position, "B" position or the like may be provided instead of the shift gate 22 and the shift lever 24.

The HV-ECU 30 includes a CPU (Central Processing Unit), memories (ROM (Read Only Memory) and RAM (Random Access Memory)), and an input/output port through which various signals are input and output, and so on (which are all not shown), and comprehensively manages the operation of the shift control system 10 based on signals SP from the shift operation device 20.

The HV-ECU 30 detects whether the P range has been selected or a non-P range, i.e., any one of the D range, R range, N range and B range has been selected in the shift operation device 20 based on a signal SP from the shift operation device 20.

When one of the D range, R range and B range has been selected, the HV-ECU 30 outputs a signal that commands the P-ECU 40 to bring the P-lock device 48 into a non-parking lock state (a state where parking lock by the P-lock device 48 is cancelled) (non-P command signal), and calculates requested torque based on vehicle information (such as an accelerator operation amount and a vehicle speed) and outputs a torque command corresponding to the selected range and the requested torque to a PCU 140 (which is described later). The HV-ECU 30 also outputs a non-P command signal to the P-ECU 40 when the N range has been selected. When the P range has been selected, the HV-ECU 30 outputs a signal that commands the P-ECU 40 to bring the P-lock device 48 into a parking lock state (P command signal).

When charge of an electric storage device 130 by means of the power feeding device 200, which is located outside the vehicle, (which is hereinafter referred to as "external charge") is requested when parking lock by the P-lock device 48 is in operation, the HV-ECU 30 sends a power feeding start command to the power feeding device 200 via the communication device 32 (which is described later). When charge of the electric storage device 130 is completed because an SOC (State Of Charge) of the electric storage device 130 has reached a predetermined amount through external charge, for example, the HV-ECU 30 sends a power feeding stop command to the power feeding device 200 via the communication device 32. A request for external charge is made by the user through operation of a contactless charge switch (not shown), for example.

When a non-P range is selected by means of the shift operation device 20 during execution of external charge, the HV-ECU 30 sends an emergency stop command to the power feeding device 200 via the communication device 32 to stop power feeding quickly. Then, when it is confirmed that incoming power to a power receiving part 110 has sufficiently decreased (to generally 0, for example), the HV-ECU 30 outputs a non-P command signal to the P-ECU 40. In this respect, detailed description is given later.

The communication device 32 is configured to communicate wirelessly with a communication device 250 of the power feeding device 200. The communication device 32 sends a command that commands start/stop (including emergency stop) of transmission of electric power to the power feeding device 200, and sends electric receiving conditions (incoming voltage and incoming current, incoming power, and so on) of the power receiving part 110 to the power feeding device 200.

The P-ECU 40 includes a CPU, memories (ROM and RAM), and an input/output port through which various signals are input and output, and so on (which are all not shown), and is configured to be mutually communicable with the HV-ECU 30. When the P-ECU 40 receives a P command signal or non-P command signal from the HV-ECU 30, the P-ECU 40 controls operation of an actuator 42 for driving the P-lock device 48 based on the received P command signal or non-P command signal and on a detection signal from an encoder 46 (which is described later).

The actuator 42 is constituted of a switched reluctance motor (which is hereinafter referred to as "SR motor"), for example, and drives the P-lock device 48 according to a control signal from the P-ECU 40. Specifically, when the actuator 42 receives a P command signal from the P-ECU 40, the actuator 42 drives the P-lock device 48 so that the P-lock device 48 can become a parking lock state (a state where rotation of an axle is locked). On the other hand, when the actuator 42 receives a non-P command signal from the P-ECU 40, the actuator 42 drives the P-lock device 48 so that the P-lock device 48 can become a non-parking lock state (a state where parking lock is cancelled). While the actuator 42 is constituted of a motor in this embodiment, the actuator 42 may be configured to be operated by hydraulic pressure.

The encoder 46 rotates together with the actuator 42, and detects rotating conditions of the SR motor. The encoder 46 is a rotary encoder that outputs A-phase, B-phase and Z-phase signals, for example.

The P-ECU 40 acquires a signal that is output from the encoder 46 to grasp the rotating conditions of the SR motor, and controls the supply of electric power that is used to drive the SR motor. The P-ECU 40 outputs a P-detection signal to the HV-ECU 30 when the P-lock device 48 is in the parking lock state, and outputs a non-P-detection signal to the HV-ECU 30 when the P-lock device 48 is in the non-parking lock state.

The vehicle 1 further includes the power receiving part 110, a rectification part 120, the electric storage device 130, a power control unit (PCU) 140, and a motor generator (MG) 150.

The power receiving part 110 is configured to receive electric power (AC) that is output from a power feeding part 230 (which is described later) of the power feeding device 200 contactlessly via a magnetic field without any electric contact. For example, the power receiving part 110 includes a resonance circuit (not shown) for receiving electric power contactlessly from the power feeding part 230. While the resonance circuit can be constituted of a coil and a capacitor, no capacitor may be provided when a desired resonant state can be formed only with a coil.

The rectification part 120 is configured to rectify AC electric power that is received by the power receiving part 110 and output the rectified electric power to the electric storage device 130. The rectification part 120 includes a smoothing capacitor together with a rectifier, for example.

The electric storage device 130 is a rechargeable DC power source, and includes a secondary battery such as a lithium ion battery or nickel hydrogen battery. The electric storage device 130 stores electric power that is output from the rectification part 120. Then, the electric storage device 130 supplies the stored electric power to the PCU 140. As the electric storage device 130, an electric double-layer capacitor or the like may be employed. Although not shown, a charge relay that is turned on when external charge is executed is provided between the rectification part 120 and the electric storage device 130.

The PCU 140 is controlled by the HV-ECU 30, and performs electric power conversion between the electric storage device 130 and the motor generator 150. The PCU 140 includes an inverter that receives electric power from the electric storage device 130 to drive the motor generator 150, a converter that adjusts the level of DC voltage that is supplied to the inverter, and so on.

The motor generator 150 is an AC electric motor, and a permanent magnet synchronous electric motor that is provided with a rotor with permanent magnets embedded therein, for example. The motor generator 150 is driven by the inverter that is included in the PCU 140, and drives a drive shaft (not shown). The motor generator 150 receives torque from driving wheels to generate electric power when the vehicle is braked. The electric power that is generated by the motor generator 150 is stored in the electric storage device 130 via the PCU 140.

On the other hand, the power feeding device 200 includes a power source part 220, the power feeding part 230, a power source ECU 240, and a communication device 250. The power source part 220 is controlled by the power source ECU 240, and is configured to convert electric power that is supplied from a system power source 210 to AC outgoing power with a predetermined frequency (such as several dozen kHz) and output the outgoing power to the power feeding part 230. The power source part 220 includes a power factor correction (PFC) circuit, an inverter, and so on, for example.

The power feeding part 230 is configured to receive the outgoing power from the power source part 220 and feeds the electric power contactlessly to the power receiving part 110 of the vehicle 1 via a magnetic field that is generated around the power feeding part 230. For example, the power feeding part 230 includes a resonance circuit (not shown) for feeding electric power contactlessly to the power receiving part 110. While the resonance circuit can be constituted of a coil and a capacitor, no capacitor may be provided when a desired resonant state can be formed only with a coil.

The power source ECU 240 includes a CPU, memories (ROM and RAM), an input/output port through which various signals are input and output, and so on (which are all not shown), and controls various machines and devices of the power feeding device 200. For example, when the power source ECU 240 receives a power feeding start command from the vehicle 1 via the communication device 250 (which is described later), the power source ECU 240 controls the power source part 220 so that the power source part 220 can generate outgoing power with a predetermined frequency.

When the power source ECU 240 receives a power feeding stop command from the vehicle 1 via the communication device 250, the power source ECU 240 controls the power source part 220 so that the power source part 220 can stop output of the outgoing power. In addition, the power source ECU 240 also controls the power source part 220 so that the power source part 220 can stop output of the outgoing power when the power source ECU 240 receives an emergency stop command from the vehicle 1 via the communication device 250. Here, the power source ECU 240 controls the power source part 220 so that the outgoing power can decrease at a predetermined first power reduction rate when the power source ECU 240 stops the output of outgoing power according to a power feeding stop command, and controls the power source part 220 so that the outgoing power can decrease at a second power reduction rate which is higher than the first power reduction rate when the power source ECU 240 stops the output of outgoing power according to an emergency stop command. Again, in this respect, detailed description is given later.

The communication device 250 is configured to communicate wirelessly with the communication device 32 of the vehicle 1. The communication device 250 receives a command that commands start/stop (including emergency stop) of transmission of electric power, and electric receiving conditions of the power receiving part 110 from the vehicle 1.

Figure 2:
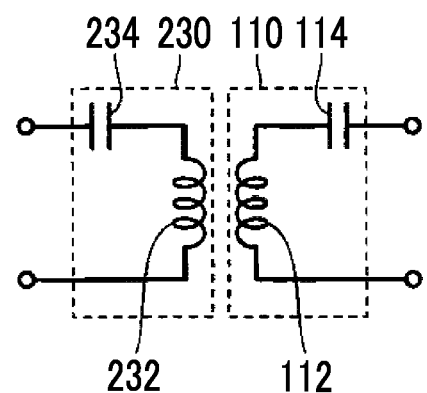
FIG. 2 is a diagram that illustrates one example of a circuit configuration of a power feeding part and a power receiving part that are shown in FIG. 1.

FIG. 2 is a diagram that illustrates one example of a circuit configuration of the power feeding part 230 and the power receiving part 110, which are shown in FIG. 1. Referring to FIG. 2, the power feeding part 230 includes a coil 232 and a capacitor 234. The capacitor 234 is connected in series to the coil 232 to form a resonance circuit together with the coil 232. The capacitor 234 is provided to adjust a resonance frequency of the power feeding part 230. In some embodiments, the resonance circuit that is constituted of the coil 232 and the capacitor 234 has a Q-value, which indicates a resonance intensity of the resonance circuit, of 100 or higher.

The power receiving part 110 includes a coil 112 and a capacitor 114. The capacitor 114 is connected in series to the coil 112 to form a resonance circuit together with the coil 112. The capacitor 114 is provided to adjust a resonance frequency of the power receiving part 110. In some embodiments, the resonance circuit that is constituted of the coil 112 and the capacitor 114 also has a Q-value of 100 or higher.

In each of the power feeding part 230 and the power receiving part 110, the capacitor may be connected in parallel to the coil. When a desired resonance frequency can be achieved without providing a capacitor, a configuration without a capacitor may be employed.

Although not particularly shown, the structure of the coils 232 and 112 is not particularly limited. For example, a coil with a swirl or helical shape that is wound around an axis along a direction in which the power feeding part 230 and the power receiving part 110 are aligned when the power feeding part 230 and the power receiving part 110 face each other may be employed as each of the coils 232 and 112. Alternatively, a coil that is formed by winding a wire around a ferrite slab that has a normal line that extends in a direction in which the power feeding part 230 and the power receiving part 110 are aligned when the power feeding part 230 and the power receiving part 110 face each other may be employed as each of the coils 232 and 112.

Referring again to FIG. 1, in this embodiment, the shift operation device 20 outputs a signal SP to the HV-ECU 30 according to an operation of the shift lever 24 and the P-switch 26, and the HV-ECU 30 controls the PCU 140 or generates a command (P command/non-P command) to control the P-lock device 48 on the basis of a signal SP from the shift operation device 20. In other words, in this embodiment, a shift-by-wire system in which the PCU 140 and the P-lock device 48 are controlled according to electric signals (signals SP) that are output from the shift operation device 20 is employed.

In this embodiment, external charge, in which the electric storage device 130, which is mounted in the vehicle, is charged using the power feeding device 200, which is located outside the vehicle, can be achieved, and a contactless charging system in which electric power is transmitted contactlessly from the power feeding part 230 of the power feeding device 200 to the power receiving part 110 of the vehicle 1 via a magnetic field without any electric contact is employed as an external charge system.

In such a contactless charging system, external charge is executed on condition that parking lock by the P-lock device is in operation (the P range has been selected). Thus, when parking lock by the P-lock device is cancelled according to an operation of the shift lever during external charge (during transmission of electric power from the power feeding device to the vehicle), it is considered that the external charge (transmission of electric power) is stopped.

However, because the vehicle becomes movable when parking lock is cancelled, the vehicle may be moved before the electric power that is being transmitted decreases sufficiently in response to the cancellation of the parking lock. When the vehicle is moved during transmission of electric power, a coupling coefficient between the power feeding part and the power receiving part experiences a sudden decrease, which may result in problems such as occurrence of a current that exceeds an upper limit in the power feeding device. To avoid such problems, the sizes of electric components may be increased in order to protect various electric components even in such a situation.

Thus, in the electric power transmission system according to this embodiment, when a non-P range (non-parking lock state) is selected according to an operation of the shift lever 24 while external charge is being executed with parking lock by the P-lock device 48 is in operation, an emergency stop command that commands an immediate stop of power feeding is sent from the vehicle 1 to the power feeding device 200, and parking lock by the P-lock device 48 is cancelled after the electric power that is being transmitted has decreased sufficiently (to generally 0, for example). In other words, in this electric power transmission system, in spite of the fact that a shift-by-wire system in which the P-lock device 48 is electrically controlled according to an operation of the shift operation device 20 is employed, parking lock by the P-lock device 48 is not immediately cancelled in synchronization with an operation of the shift lever 24 but cancelled after the electric power that is being transmitted has decreased sufficiently. Thus, according to this electric power transmission system, problems that are caused by moving the vehicle before the electric power that is being transmitted decreases sufficiently, such as a current exceeding an upper limit which is caused by a sudden change in coupling coefficient, do not occur.

In addition, in the electric power transmission system according to this embodiment, the rate at which electric power is reduced when power feeding is stopped because a non-P range (non-parking lock state) is selected according to an operation of the shift lever 24 (second power reduction rate) is higher than the rate at which electric power is reduced when power feeding is stopped in an ordinary way because external charge is completed (first power reduction rate). Thus, electric power decreases quickly when a non-P range is selected according to an operation of the shift lever 24, and, consequently, parking lock by the P-lock device 48 is cancelled immediately. It is, therefore, possible to fulfill the user's desire to cancel the external charge and move the vehicle 1 quickly.

Figure 3:
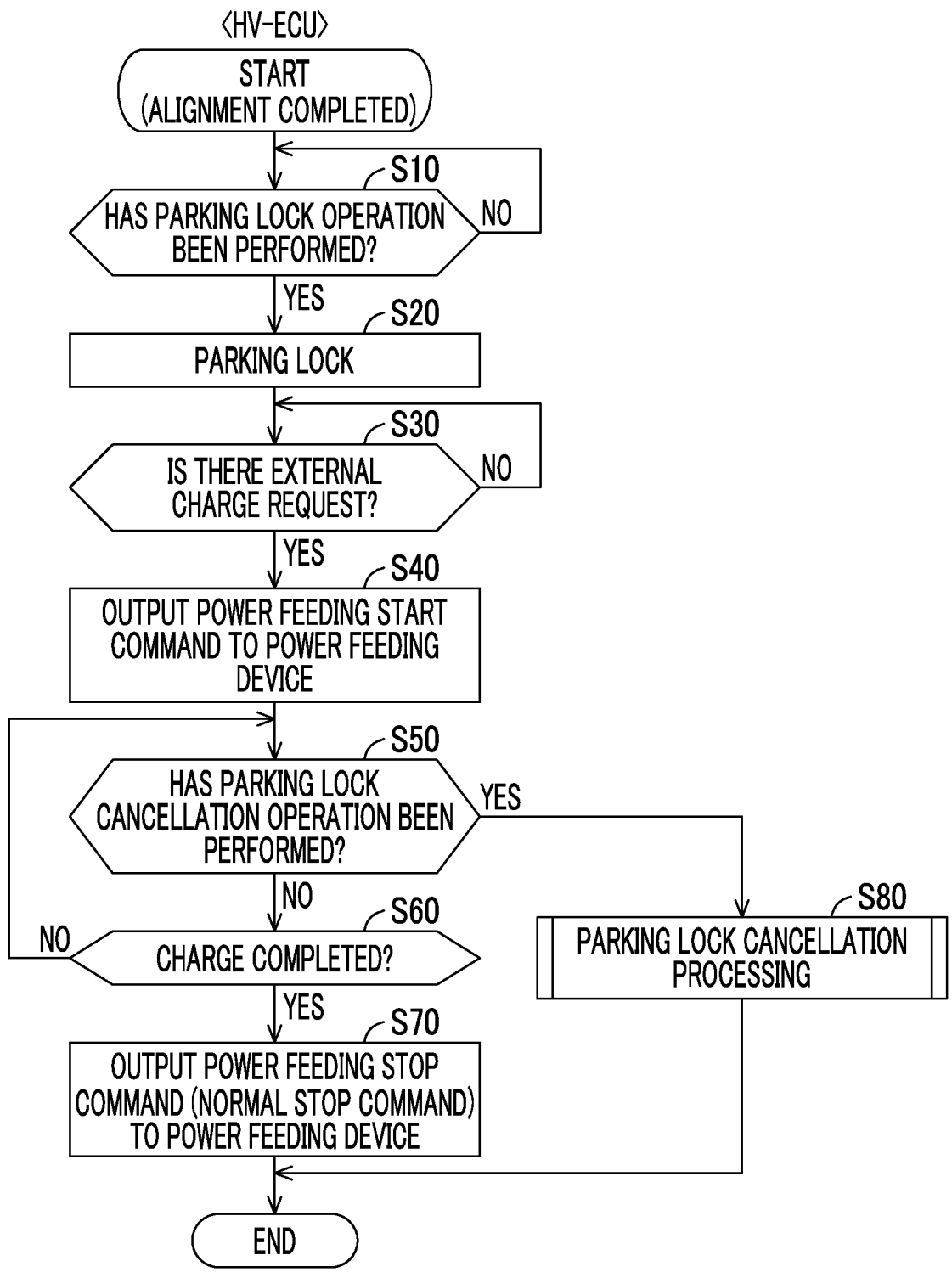
FIG. 3 is a flowchart that describes a procedure of processing that is executed by an HV-ECU at a time of external charge.

FIG. 3 is a flowchart that describes a procedure of processing that is executed by the HV-ECU 30 at a time of external charge. A series of processing that is shown in this flowchart is executed when alignment between the power feeding part 230 of the power feeding device 200 and the power receiving part 110 of the vehicle 1 is completed prior to execution of external charge, for example.

Referring to FIG. 3, when alignment between the power feeding device 200 and the vehicle 1 is completed, the HV-ECU 30 determines whether the user has performed a parking lock operation (step S10). Specifically, the HV-ECU 30 determines whether the P-switch 26 of the shift operation device 20 has been operated by the user based on a signal SP from the shift operation device 20.

If it is determined that a parking lock operation has been performed (YES in step S10), the HV-ECU 30 outputs a signal that commands the P-ECU 40 to bring the P-lock device 48 into the parking lock state (P command signal). When the P-ECU 40 receives the P command signal from the HV-ECU 30, the P-ECU 40 drives the actuator 42 according to the P command. As a result, the P-lock device 48 is brought into the parking lock state (step S20).

Then, the HV-ECU 30 determines whether there is a request for external charge (step S30). For example, it is determined that there is a request for external charge when a contactless charge switch (not shown) which is provided to be operable by the user has been operated by the user.

Then, it is determined that there is a request for external charge because the contactless charge switch has been operated by the user, for example (YES in step S30), the HV-ECU 30 outputs a power feeding start command that commands start of power feeding from the power feeding device 200 to the vehicle 1 to the power feeding device 200 via the communication device 32 (step S40). As a result, power feeding from the power feeding part 230 of the power feeding device 200 to the power receiving part 110 of the vehicle 1 is started, and charging of the electric storage device 130 by the power feeding device 200 (external charge) is started.

During the execution of external charge, the HV-ECU 30 determines whether the user has performed a parking lock cancellation operation (step S50). Specifically, the HV-ECU 30 determines whether the user has operated the shift lever 24 of the shift operation device 20 to select a non-P range (non-parking lock state) based on a signal SP from the shift operation device 20.

If it is determined that no parking lock cancellation operation has been performed (NO in step S50), the HV-ECU 30 determines whether the external charge has been completed (step S60). For example, the HV-ECU 30 determines that the external charge has been completed when the SOC of the electric storage device 130 has reached a predetermined amount.

If it is determined that the external charge has not been completed (NO in step S60), the processing is returned to step S50 and it is determined again whether a parking lock cancellation operation has been performed. Then, if it is determined in step S60 that the external charge has been completed (YES in step S60), the HV-ECU 30 outputs a power feeding stop command that commands stop of the power feeding from the power feeding device 200 to the vehicle 1 (normal stop command) to the power feeding device 200 via the communication device 32 (step S70). As a result, the power feeding from the power feeding part 230 of the power feeding device 200 to the power receiving part 110 of the vehicle 1 is stopped to finish the external charge.

On the other hand, if it is determined in step S50 that a parking lock cancellation operation has been performed, in other words, the shift lever 24 is operated to select a non-P range (non-parking lock state) during external charge (YES in step S50), the HV-ECU 30 executes the following parking lock cancellation processing (step S80).

Figure 4:
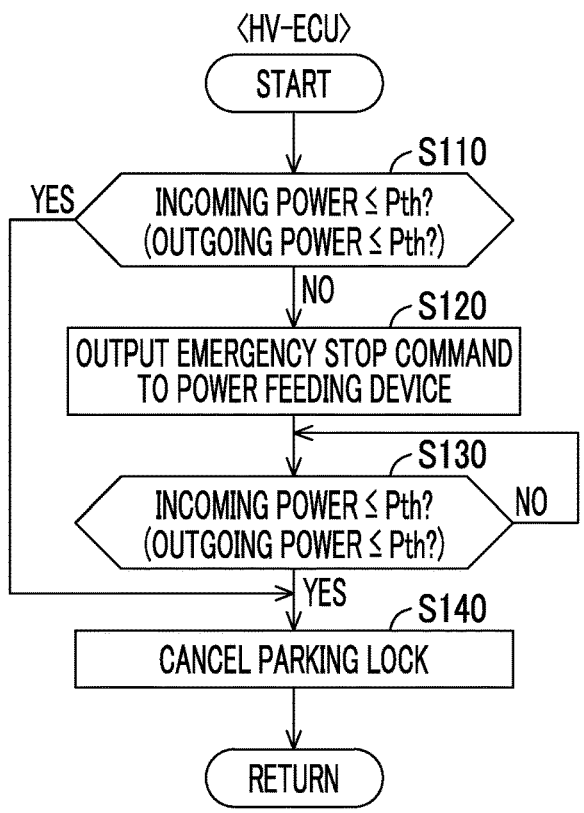
FIG. 4 is a flowchart that describes a procedure of parking lock cancellation processing that is executed in step S80 of FIG. 3.

FIG. 4 is a flowchart that describes a procedure of the parking lock cancellation processing that is executed in step S80 of FIG. 3. Referring to FIG. 4, the HV-ECU 30 determines whether incoming power to the power receiving part 110 is equal to or lower than a threshold value Pth (step S110). The threshold value Pth is a determination value that is used to determine whether the incoming power has decreased sufficiently (to generally 0, for example). The incoming power is calculated based on detection values from a voltage sensor (not shown) and a current sensor (not shown) that detect a receiving voltage and a receiving current, respectively.

Instead of the determination based on incoming power, the HV-ECU 30 may determine whether outgoing power from the power feeding device 200 is equal to or lower than a threshold value Pth. In this case, the HV-ECU 30 can use a detection value of the outgoing power that is received from the power feeding device 200 via the communication device 32 for the above determination.

If it is determined in step S110 that the incoming power is higher than the threshold value Pth (NO in step S110), the HV-ECU 30 outputs an emergency stop command that commands an immediate stop of power feeding from the power feeding device 200 to the vehicle 1 to the power feeding device 200 via the communication device 32 (step S120). In other words, when power feeding is stopped according to a parking lock cancellation operation, an emergency stop command is output to the power feeding device 200 so that power feeding can be quickly stopped compared to the case where power feeding is stopped in response to completion of external charge (step S70 of FIG. 3).

After outputting an emergency stop command to the power feeding device 200, the HV-ECU 30 determines once again whether the incoming power to the power receiving part 110 is equal to or lower than the threshold value Pth (step S130). Again in this case, the HV-ECU 30 may determine whether the outgoing power is equal to or lower than the threshold value Pth instead of the determination based on incoming power.

Then, if it is determined that the incoming power is equal to or lower than the threshold value Pth (YES in step S130), the HV-ECU 30 outputs a signal that commands the P-ECU 40 to bring the P-lock device 48 into the non-parking lock state (non-P command signal). When the P-ECU 40 receives the non-P command signal from the HV-ECU 30, the P-ECU 40 drives the actuator 42 according to the non-P command. As a result, parking lock by the P-lock device 48 is cancelled (step S140).

If it is determined in step S110 that the incoming power is equal to or lower than the threshold value Pth (YES in step S110), the HV-ECU 30 advances the processing to step S140 without executing steps S120 and S130 to cancel parking lock by the P-lock device 48 because charging power has already decreased sufficiently.

While parking lock is cancelled when it is determined in step S130 that the incoming power (or outgoing power) is equal to or lower than the threshold value Pth in the above, the parking lock may be cancelled when a predetermined amount of time which is considered long enough for the electric power to decrease sufficiently has passed after an emergency stop command is output to the power feeding device 200 in step S120, for example, instead of the determination based on electric power.

Figure 5:
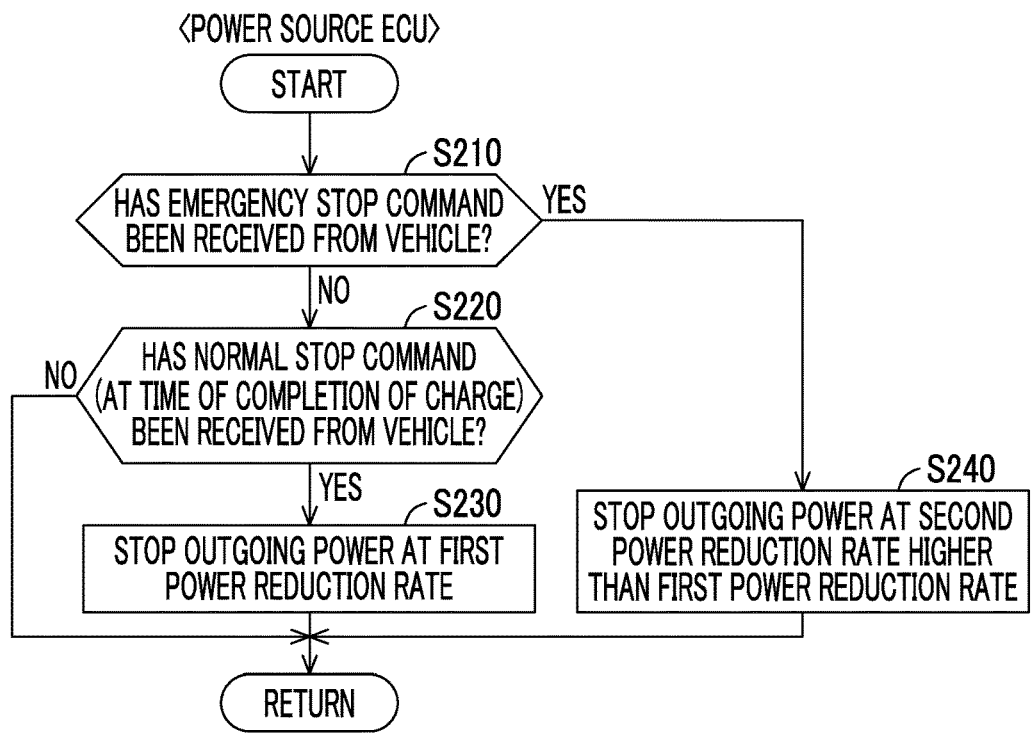
FIG. 5 is a flowchart that describes a procedure of processing that is executed according to a power feeding stop command from a vehicle in a power source ECU that is shown in FIG. 1.

FIG. 5 is a flowchart that describes a procedure of processing that is executed according to a power feeding stop command from the vehicle 1 in the power source ECU 240, which is shown in FIG. 1. The processing that is shown in this flowchart is repeatedly executed every predetermined period of time at least during power feeding from the power feeding device 200 to the vehicle 1.

Referring to FIG. 5, the power source ECU 240 determines whether an emergency stop command has been received from the vehicle 1 via the communication device 250 (step S210). The emergency stop command is the one that is sent from the vehicle 1 to the power feeding device 200 in step S120 of FIG. 4.

If reception of an emergency stop command is not confirmed (NO in step S210), the power source ECU 240 determines whether a normal stop command has been received from the vehicle 1 via the communication device 250 (step S220). The normal stop command is the one that is sent from the vehicle 1 to the power feeding device 200 in step S70 of FIG. 3, for example.

If it is determined in step S220 that a normal stop command has been received (YES in step S220), the power source ECU 240 controls the power source part 220 so that the outgoing power can be stopped at a predetermined first power reduction rate (step S230). If reception of a normal stop command is not confirmed in step S220 (NO in step S220), the processing is advanced to return.

On the other hand, if it is determined in step S210 that an emergency stop command has been received (YES in step S210), the power source ECU 240 controls the power source part 220 so that the outgoing power can be stopped at a second power reduction rate that is higher than the first power reduction rate (step S240). In this way, when stop of power feeding is requested according to an emergency stop command in response to a parking lock cancellation operation, power feeding is stopped at a power reduction rate which is higher than that at which power feeding is stopped when stop of power feeding is requested according to a normal stop command in response to, for example, completion of external charge.

As described above, in this embodiment, parking lock by the P-lock device 48 is not immediately cancelled in synchronization with an operation of the shift lever 24 but cancelled (switching from the parking lock state to the non-parking lock state is achieved) after the electric power that is being transmitted (charging power or outgoing power) has decreased sufficiently. Thus, according to this embodiment, problems that are caused by moving the vehicle 1 before the electric power that is being transmitted decreases sufficiently, such as a current exceeding an upper limit which is caused by a sudden change in coupling coefficient between the power feeding part 230 and the power receiving part 110, do not occur.

In addition, in this embodiment, the rate at which electric power is reduced when power feeding is stopped because a non-P range (non-parking lock state) is selected according to an operation of the shift lever 24 (second power reduction rate) is higher than the rate at which electric power is reduced when power feeding is stopped in an ordinary way because external charge is completed (first power reduction rate). Thus, electric power decreases quickly when a non-P range is selected according to an operation of the shift lever 24, and, consequently, parking lock is cancelled immediately. Therefore, according to this embodiment, it is possible to fulfill the user's desire to cancel the external charge and move the vehicle 1 quickly.

In the above embodiment, the rate at which electric power is reduced when power feeding is stopped because a non-P range (non-parking lock state) is selected according to an operation of the shift lever 24 (second power reduction rate) is higher than the rate at which electric power is reduced when power feeding is stopped in an ordinary way because external charge is completed (first power reduction rate). However, it is not required to provide a difference between the power reduction rates. For example, the second power reduction rate may be equal to the first power reduction rate.

In the above description, the communication device 32 corresponds to one example of a "communication part" and a "first communication part" in this disclosure, and the shift operation device 20 corresponds to one example of an "operating part" in this disclosure. The P-lock device 48 corresponds to one example of a "parking lock device" in this disclosure, and the HV-ECU 30 corresponds to one example of a "controller" in this disclosure. In addition, the power source ECU 240 corresponds to one example of a "power source controller" in this disclosure, and the communication device 250 corresponds to one example of a "second communication part" in this disclosure.

It should be understood that the embodiments that are disclosed herein are not restrictive but illustrative in all aspects. The scope of this disclosure is defined by the appended claims rather than by the above description of the embodiment, and all changes that fall within the meaning and range of equivalents of the claims are intended to be embraced thereby.

What is claimed is:

1. A vehicle equipped with a power receiving device that is configured to receive electric power contactlessly from a power feeding device that is located outside the vehicle, the vehicle comprising:

a power receiving part configured to receive electric power contactlessly from a power feeding part of the power feeding device;

a communication part configured to communicate with the power feeding device;

an operating part configured to allow a driver to select a parking lock state where rotation of an axle is locked or a non-parking lock state where the parking lock state is cancelled;

a parking lock device configured to be mechanically switchable between the parking lock state and the non-parking lock state; and a controller configured to control the parking lock device according to an electric signal that is output from the operating part, wherein, while the power receiving part is receiving electric power with the parking lock device being in the parking lock state, the controller sends a first command that commands stop of power feeding to the power receiving device to the power feeding device via the communication part when the non-parking lock state is selected by the operating part, and controls the parking lock device so that the parking lock device is switched from the parking lock state to the non-parking lock state after electric power that is being transmitted from the power feeding device to the power receiving device has decreased to a predetermined value or lower.

2. The vehicle according to claim 1, further comprising an electric storage device configured to store electric power that is received by the power receiving part, wherein the controller sends a second command that commands stop of power feeding to the power receiving device to the power feeding device via the communication part when charge of the electric storage device with the electric power that is received by the power receiving part is completed, and wherein a power reduction rate at which outgoing power is reduced according to the first command is higher than that at which outgoing power is reduced according to the second command.

3. An electric power transmission system comprising a vehicle equipped with a power receiving device and a power feeding device located outside the vehicle, the power feeding device including a power feeding part configured to feed electric power contactles sly to the power receiving device, the vehicle including:

a power receiving part configured to receive electric power contactles sly from the power feeding part;

a first communication part configured to communicate with the power feeding device; an operating part configured to allow a driver to select a parking lock state where rotation of an axle is locked or a non-parking lock state where the parking lock state is cancelled;

a parking lock device configured to be mechanically switchable between the parking lock state and the non-parking lock state; and a controller configured to control the parking lock device according to an electric signal that is output from the operating part, wherein, while the power receiving part is receiving electric power with the parking lock device in the parking lock state, the controller:

sends a first command that commands stop of power feeding to the power receiving device to the power feeding device via the first communication part when the non-parking lock state is selected by means of the operating part; and controls the parking lock device so that the parking lock device can be switched from the parking lock state to the non-parking lock state after electric power that is being transmitted from the power feeding device to the power receiving device decreases to a predetermined value or lower.

4. The electric power transmission system according to claim 3, the vehicle further including an electric storage device configured to store electric power that is received by the power receiving part, the power feeding device further comprising:

a power source part configured to generate outgoing power that is supplied to the power feeding part;

a power source controller configured to control the power source part; and a second communication part configured to communicate with the first communication part, wherein the controller sends a second command that commands stop of power feeding to the power receiving device to the power feeding device via the first communication part when charge of the electric storage device with the electric power that is received by the power receiving part is completed, and wherein the power source controller controls the power source part so that the outgoing power decreases at a first power reduction rate when the power source controller receives the second command via the second communication part, and controls the power source part so that the outgoing power decreases at a second power reduction rate that is higher than the first power reduction rate when the power source controller receives the first command via the second communication part.

* * * * *

UNITED STATES PATENT AND TRADEMARK OFFICE
CERTIFICATE OF CORRECTION

PATENT NO. : 10,711,894 B2
APPLICATION NO. : 15/899504
DATED : July 14, 2020
INVENTOR(S) : Toshiya Hashimoto It is certified that error appears in the above-identified patent and that said Letters Patent is hereby corrected as shown below:

On the Title Page

Item (72), inventor 1, city, delete "Miyoshi" and insert --Miyoshi-shi Aichi-ken--, therefor.

In the Claims

In Column 14, Line 47, Claim 3, delete "contactles sly" and insert --contactlessly--, therefor.

In Column 14, Line 51, Claim 3, delete "contactles sly" and insert --contactlessly--, therefor.

Signed and Sealed this
Tenth Day of November, 2020

Andrei Iancu
*Director of the United States Patent and Trademark Office*